(12) United States Patent
Rittinge et al.

(10) Patent No.: US 12,370,783 B2
(45) Date of Patent: Jul. 29, 2025

(54) BUILDING PANEL AND A METHOD TO PRODUCE SUCH A BUILDING PANEL

(71) Applicant: Välinge Innovation AB, Viken (SE)

(72) Inventors: Rickard Rittinge, Förslöv (SE); Sofia Nilsson, Jonstorp (SE)

(73) Assignee: VALINGE INNOVATION AB, Viken (SE)

( * ) Notice: Subject to any disclaimer, the term of this patent is extended or adjusted under 35 U.S.C. 154(b) by 0 days.

(21) Appl. No.: 17/768,047

(22) PCT Filed: Oct. 16, 2020

(86) PCT No.: PCT/SE2020/050991
§ 371 (c)(1),
(2) Date: Apr. 11, 2022

(87) PCT Pub. No.: WO2021/076041
PCT Pub. Date: Apr. 22, 2021

(65) Prior Publication Data
US 2024/0009974 A1    Jan. 11, 2024

(30) Foreign Application Priority Data

Oct. 18, 2019   (SE) .................................. 1930333-8
Dec. 6, 2019    (SE) .................................. 1951410-8

(51) Int. Cl.
*B32B 21/13*        (2006.01)
*B27D 1/06*         (2006.01)
(Continued)

(52) U.S. Cl.
CPC ................ *B32B 21/13* (2013.01); *B27D 1/06* (2013.01); *B32B 3/085* (2013.01); *B32B 7/12* (2013.01);
(Continued)

(58) Field of Classification Search
CPC ......... B32B 3/085; B32B 21/13; B32B 21/14; B32B 21/02; B32B 7/12;
(Continued)

(56) References Cited

U.S. PATENT DOCUMENTS 6,132,549 A       10/2000   Nieckarz et al.
2005/0196607 A1    9/2005   Shih et al.
(Continued)

FOREIGN PATENT DOCUMENTS

EP    2353861 A1      8/2011
JP    08193412 A   *  7/1996
JP    2006233662 A *  9/2006

OTHER PUBLICATIONS

Translation of JPH08193412A (bib, description and claims). (Year: 1996).*

(Continued)

*Primary Examiner* — Catherine A. Simone
(74) *Attorney, Agent, or Firm* — Boone IP Law

(57) ABSTRACT

A building panel including a balancing layer, the balancing layer including a first wood veneer having a grain direction, a first sub-layer is arranged on a top surface of the balancing layer, the first sub-layer including a first binder, a core arranged on the first sub-layer, a surface layer arranged on the core, the surface layer, wherein a top surface of the surface layer is adapted to be a visible surface of the building panel when installed, wherein an extension of the balancing layer in a direction parallel to the grain direction of the first wood veneer is equal or less than an extension of the core in the direction parallel to the grain direction of the first wood veneer, and wherein the balancing layer is arranged within the extension of the core in the direction parallel to the grain direction of the first wood veneer.

20 Claims, 5 Drawing Sheets

(51) Int. Cl.
  *B32B 3/08*    (2006.01)
  *B32B 7/12*    (2006.01)
  *B32B 21/02*   (2006.01)
  *B32B 21/14*   (2006.01)
  *B32B 37/18*   (2006.01)
  *B44C 5/04*    (2006.01)
  *E04F 13/08*   (2006.01)
  *E04F 13/10*   (2006.01)
  *E04F 15/04*   (2006.01)
  *E04F 15/10*   (2006.01)

(52) U.S. Cl.
  CPC .............. *B32B 21/02* (2013.01); *B32B 21/14* (2013.01); *B32B 37/18* (2013.01); *E04F 13/0866* (2013.01); *E04F 13/10* (2013.01); *E04F 15/041* (2013.01); *E04F 15/107* (2013.01); *B32B 2250/44* (2013.01); *B32B 2307/7376* (2023.05); *B32B 2317/16* (2013.01); *B32B 2607/00* (2013.01); *B44C 5/043* (2013.01)

(58) Field of Classification Search
  CPC ........ B32B 2307/7376; B32B 2250/44; B32B 2317/16; B32B 2607/00; B32B 21/042; B27D 1/06; E04F 13/0866; E04F 13/10; E04F 15/041; E04F 15/107; E04F 13/0873; E04F 15/04; B44F 9/02
  See application file for complete search history.

(56) References Cited

U.S. PATENT DOCUMENTS

| | | |
|---|---|---|
| 2011/0162794 A1 | 7/2011 | Zeik et al. |
| 2017/0305119 A1 | 10/2017 | Bergelin et al. |
| 2019/0210329 A1 | 7/2019 | Ziegler et al. |
| 2019/0210330 A1 | 7/2019 | Ziegler et al. |

OTHER PUBLICATIONS

Translation of JP2006233662A. (Year: 2006).*
International Preliminary Report on Patentability received for PCT Patent Application No. PCT/SE20/050991, mailed on Apr. 28, 2022, 9 pages.
International Search Report and Written Opinion received for PCT Patent Application No. PCT/SE2020/050991, mailed on Nov. 18, 2020, 13 pages.
Supplementary European Search Report and Search Opinion received for European Application No. 20875830.0, mailed on Sep. 13, 2023, 7 pages.
Swedish Official Action issued by the Swedish Patent and Registration Office (PRV) in Swedish Patent Application No. 1930333-8 on Apr. 29, 2020 (9 pages).
U.S. Appl. No. 17/768,022, Rickard Rittinge, filed Apr. 11, 2022.
U.S. Appl. No. 17/856,108, Göran Ziegler, filed Jul. 1, 2022.

* cited by examiner

BUILDING PANEL AND A METHOD TO PRODUCE SUCH A BUILDING PANEL

TECHNICAL FIELD

The disclosure generally relates but is not limited to the field of building panels with a balancing layer, preferably floor panels, wall panels and furniture components.

TECHNICAL BACKGROUND

Embodiments of the invention are particularly suitable for use in floating floors, which are formed of floor panels with a balancing layer positioned on the substrate on the surface opposite to the surface wherein a surface layer is attached. The following description of known technique, problems of known systems and objects and features of the disclosure will therefore, as a non-restrictive example, be aimed above all at this field of application and in particular at floorings which are similar to traditional wood fibre based laminate floorings.

It should be emphasized that the embodiments of the invention can also be used in other applications as, for example, wall panels, ceilings, furniture components, and similar.

Known Technique and Problems Thereof

Several technologies are used to provide a floor panel, which are similar to the solid floor panel. These panels may be produced more cost efficient and a floor with a separate layer attached to a substrate of for example HDF, plywood or wood veneer is more moisture stable than solid wood floors.

Wood fibre based direct pressed laminated flooring usually comprises a core of a 6-12 mm fibre board, a 0.2 mm thick upper decorative surface layer of laminate and a 0.1-0.2 mm thick lower balancing layer of laminate, plastic, paper or like material.

A laminate surface generally comprises two paper sheets, a 0.1 mm thick printed decorative paper and a transparent 0.05-0.1 mm thick overlay intended to protect the decorative paper from abrasion. The transparent overlay, which is made of α-cellulose fibres, comprises small hard and transparent aluminium oxide particles, which gives the surface layer a high wear resistance.

The printed decorative paper and the overlay are impregnated with melamine resin and laminated to a wood fibre based core under heat and pressure. The two papers have prior to pressing a total thickness of about 0.3 mm and they are after pressing compressed to about 0.2 mm.

Other common surface materials are wood veneer and foils, which are glued to a substrate. The surface may also be a powder layer comprising wood fibres, melamine resins, colour pigments and, optionally, aluminium oxide particles.

Wood veneers may provide the most natural look of a building panel.

It is known that a wood veneer may be pressed on a powder layer as described above and that such a powder layer may provide increased impact resistance. This will not solve the cost problems.

U.S. Pat. No. 2,831,793 discloses a composite wood veneer panel. A thin veneer is applied to a composite fibrous core of lignocellulose particles and binder and openings of the veneer are filled with core material when pressed together to form the composite panel. In the manufacture of the plywood or veneered panels according to this document, the plugging of the surface layer opening defects is done simultaneously with the formation of the board.

SUMMARY

It is an object of at least certain aspects of the present invention to provide an improvement over the above described techniques and known art.

It is a further object of at least certain aspects the invention to provide a building panel with the improved surface properties.

The objective of at least certain embodiments of the present invention is to provide a building panel, such as a floor panel, with a wood based surface layer, which has a more attractive surface design and/or better surface properties and/or cost structure than present known floorings.

It is a further object of at least certain aspects the invention to minimise the costs of production of the building panel, by for example avoiding cutting any discoloured parts or edges.

At least some of these and other objects and advantages that will be apparent from the description.

In a first aspect, a building panel is provided, comprising:
  a balancing layer having a top surface and a bottom surface, the balancing layer comprising a first wood veneer having a grain direction,
  a first sub-layer is arranged on the top surface of the balancing layer, the first sub-layer comprising a first binder,
  a core arranged on the first sub-layer,
  a surface layer arranged on the core, the surface layer having a top surface and a bottom surface, wherein the top surface of the surface layer is adapted to be a visible surface of the building panel when installed,
  wherein an extension of the balancing layer in a direction parallel to the grain direction of the first wood veneer is equal or less than an extension of the core in the direction parallel to the grain direction of the first wood veneer, and
  wherein the balancing layer is arranged within the extension of the core in the direction parallel to the grain direction of the first wood veneer.

The balancing layer being arranged within the extension of the core in the direction parallel to the grain direction of the first wood veneer may be defined as being arranged within the boundaries of the core in said direction, and/or as the balancing layer ends within the extension of the core in said direction.

The core may extend to, or extend beyond, the balancing layer in a direction parallel to the grain direction of the first wood veneer.

An edge of the first veneer extending in the direction transverse to the grain direction of the first veneer may be a short edge of the first veneer. The short edge of the first veneer may be position within the boundaries of the core, including being aligned with an edge of the core.

The balancing layer may comprise several veneer parts together forming the first veneer, such as being stitched or glued together, or may comprise several first veneers.

In the following, the direction parallel to the grain direction and a direction transverse to the grain direction are parallel to a plane formed by the lower surface of the balancing layer.

An advantage of the first aspect is that bleeding of the binder from the sub-layer to the first wood veneer of the balancing layer is at least reduced by positioning the balancing layer within the extension the core. By an edge of the balancing layer being aligned with an edge of the core, or arranged with a distance from the extension of the core, this so-called "waterfall" tendency is at least reduced. Discolouration of the first wood veneer by the binder is reduced. Thereby, the amount of waste resulting from portions of the wood veneer that is required to be removed due to this discolouration is reduced.

Furthermore, the "waterfall" tendency also leads to inferior connection between the wood veneer and the sub-layer and/or core. During transportation, the wood veneer tends to disconnect from the core/sub-layer due to the waterfall effect, and tends to flake. Thereby, improved connection between the wood veneer and the core is obtained.

This waterfall tendency is increased and more apparent on an edge of the wood veneer extending in the direction transverse to the grain direction. The binder tends to travel around the edge and then continue in the grain direction. An edge of a wood veneer extending in a direction transverse to the grain direction often forms a short side edge of the wood veneer.

In the final building panel, any protruding part of the balancing layer and/or the first sub-layer may be cut, for example as a consequence of forming a locking system. Compared to the situation where the waterfall tendency has occurred, the portion to be removed is smaller than if the binder has discoloured the top surface of the surface layer.

An extension of the balancing layer in a direction transverse to the grain direction of the first wood veneer may be equal or less than an extension of the core in the direction transverse to the grain direction of the first wood veneer, and wherein the balancing layer may be arranged within the extension of the core in the direction transverse to the grain direction of the first wood veneer. Thereby, the waterfall tendency is reduced also along an edge of the first wood veneer extending parallel to the grain direction, such as a long side edge.

The core, in the direction parallel to the grain direction of the first wood veneer, may extends beyond an edge of the balancing layer with a distance of 1 mm or more, preferably with a distance of 2 mm or more.

The core, in the direction transverse to the grain direction of the first wood veneer, may extend beyond an edge of the balancing layer with a distance of 1 mm or more, preferably with a distance of 2 mm or more.

The core may be a wood-based core such as HDF board, MDF board, wood plastic composite, plywood, or lamella core.

The core may have a thickness of between 1 and 15 mm.

The surface layer may comprise a second wood veneer.

An extension of the surface layer in a direction parallel to a grain direction of the second wood veneer may be equal or less than an extension of the balancing layer in the direction parallel to the grain direction of the second wood veneer. The surface layer may be arranged within the extension of the balancing layer in the direction parallel to the grain direction of the second wood veneer.

An extension of the surface layer in a direction transverse to a grain direction of the second wood veneer may be equal or less than an extension of the balancing layer in the direction parallel to the grain direction transverse of the second wood veneer. The surface layer may be arranged within the extension of the balancing layer in the direction transverse to the grain direction of the second wood veneer.

The first and/or the second wood veneer may be selected from oak, maple, birch, walnut, ash, fir and pine.

The surface layer may be selected from a paper overlay, a powder based surface layer or a lacquer.

The surface layer may be attached to the core by an adhesive, the adhesive being selected from a second binder, a second sub-layer comprising a second binder, or glue.

The first and/or second binder may be in powder form.

The first and/or second binder may be a thermoplastic or a thermosetting binder.

The balancing layer may have a thickness of between 0.2 mm and 2.5 mm.

The first sub-layer and/or the second sub-layer may comprise inorganic fillers.

The first sub-layer and/or the second sub-layer may comprise fibres, preferably wood fibres.

The first binder may be the same or different from the second binder.

The first binder and/or second binder may be an amino resin, preferably melamine formaldehyde resin or urea formaldehyde resin.

The building panel may have a thickness between 1 mm and 20 mm, preferably between 2 mm and 12 mm.

The building panel may be selected from a floor panel, a wall panel or a furniture panel.

According to a second aspect, a method to produce a building panel is provided. The method comprises:

providing a balancing layer having a top surface and a bottom surface, the balancing layer comprising a first wood veneer having a grain direction, arranging a first sub-layer on the top surface of the balancing layer, the first sub-layer comprising a first binder, arranging a core on the first sub-layer, arranging a surface layer on the core, the surface layer having a top surface and a bottom surface, wherein the top surface of the surface layer is adapted to be a visible surface of the building panel when installed, wherein an extension of the balancing layer in a direction parallel to the grain direction of the first wood veneer is equal or less than an extension of the core in the direction parallel to the grain direction of the first wood veneer, positioning the balancing layer relative the core such that the balancing layer is arranged within the extension of the core in the direction parallel to the grain direction of the first wood veneer, and applying heat and pressure to the balancing layer, the first sub-layer, the core and the surface layer to form the building panel.

By the balancing layer being arranged within the extension of the core in the direction parallel to the grain direction of the first wood veneer may be defined as being arranged within the boundaries of the core in said direction, or as the balancing layer ends within the extension of the core in said direction.

The core may extend to, or extend beyond, the balancing layer in a direction parallel to the grain direction of the first wood veneer.

An edge of the first veneer extending in the direction transverse to the grain direction of the first veneer may be a short edge of the first veneer. The short edge of the first veneer may be position within the boundaries of the core, including being aligned with an edge of the core.

The balancing layer may comprise several veneer parts together forming the first veneer, such as being stitched or glued together, or may comprise several first veneers.

In the following, the direction parallel to the grain direction and a direction transverse to the grain direction are parallel to a plane formed by the lower surface of the balancing layer.

The second aspect incorporates all the advantages previously discussed when referring to the first aspect, whereby the previous discussion is applicable also for the method to produce the wood-based board.

An extension of the balancing layer in a direction transverse to the grain direction of the first wood veneer may be equal or less than an extension of the core in the direction transverse to the grain direction of the first wood veneer, and wherein the balancing layer may be arranged within the extension of the core in the direction transverse to the grain direction of the first wood veneer.

The core, in the direction parallel to the grain direction of the first wood veneer, may extend beyond an edge of the balancing layer with a distance of 1 mm or more, preferably with a distance of 2 mm or more.

The core, in the direction transverse to the grain direction of the first wood veneer, may extend beyond an edge of the balancing layer with a distance of 1 mm or more, preferably with a distance of 2 mm or more.

The core may be a wood-based core such as HDF board, MDF board, wood plastic composite, plywood or a lamella core.

The core may have a thickness after pressing of between 1 and 15 mm.

The surface layer may comprise a second wood veneer.

An extension of the surface layer in a direction parallel to a grain direction of the second wood veneer may be equal or less than an extension of the balancing layer in the direction parallel to the grain direction of the second wood veneer. The surface layer may be arranged within the extension of the balancing layer in the direction parallel to the grain direction of the second wood veneer.

An extension of the surface layer in a direction transverse to a grain direction of the second wood veneer may be equal or less than an extension of the balancing layer in the direction parallel to the grain direction transverse of the second wood veneer. The surface layer may be arranged within the extension of the balancing layer in the direction transverse to the grain direction of the second wood veneer.

The first and/or the second wood veneer may be selected from oak, maple, birch, walnut, ash, fir and pine.

The surface layer may be selected from a paper overlay, a powder based surface layer or a lacquer.

The surface layer may be attached to the core by an adhesive, the adhesive being selected from a second binder, a second sub-layer comprising a second binder or glue.

The first and/or second binder may be applied in powder form.

The first and/or second binder may be a thermoplastic or a thermosetting binder.

The balancing layer may have a thickness after pressing of between 0.2 mm and 2.5 mm.

The first sub-layer and/or the second sub-layer may comprise inorganic fillers.

The first sub-layer and/or the second sub-layer may comprise fibres, preferably wood fibres.

The first binder may be the same or different from the second binder.

The first binder and/or second binder may be an amino resin, preferably melamine formaldehyde resin or urea formaldehyde resin.

The thickness of the building panel after pressing may be between 1 mm and 20 mm, preferably between 4 mm and 12 mm.

The building panel may be selected from a floor panel, a wall panel or a furniture panel.

In an aspect, the second sub-layer, the core and the first sub-layer is replaced with the first sub-layer only. In this aspect, the building panel comprises a balancing layer having a top surface and a bottom surface, the balancing layer comprising a first wood veneer having a grain direction, a first sub-layer is arranged on the top surface of the balancing layer, the first sub-layer comprising a first binder, a surface layer arranged on the first sub-layer, the surface layer having a top surface and a bottom surface, wherein the top surface of the surface layer is adapted to be a visible surface of the building panel when installed, wherein an extension of the balancing layer in a direction parallel to the grain direction of the first wood veneer is equal or less than an extension of the first sub-layer in the direction parallel to the grain direction of the first wood veneer, and wherein the balancing layer is arranged within the extension of the first sub-layer in the direction parallel to the grain direction of the first wood veneer.

The building panel may be produced by a method comprising providing a balancing layer having a top surface and a bottom surface, the balancing layer comprising a first wood veneer having a grain direction, applying a first sub-layer is arranged on the top surface of the balancing layer, the first sub-layer comprising a first binder, arranging a surface layer on the first sub-layer, the surface layer having a top surface and a bottom surface, wherein the top surface of the surface layer is adapted to be a visible surface of the building panel when installed, wherein an extension of the balancing layer in a direction parallel to the grain direction of the first wood veneer is equal or less than an extension of the sub-layer in the direction parallel to the grain direction of the first wood veneer, positioning the balancing layer relative the sub-layer such that the balancing layer is arranged within the extension of the core in the direction parallel to the grain direction of the first wood veneer, and applying heat and pressure to the balancing layer, the first sub-layer and the surface layer to form the building panel.

BRIEF DESCRIPTION OF THE DRAWINGS

These and other aspects, features and advantages of which embodiments of the invention are capable of, will be apparent and elucidated from the following description of embodiments and aspects of the present invention, reference being made to the accompanying drawings, to which a reference is made in the text.

DETAILED DESCRIPTION

Figure 1:
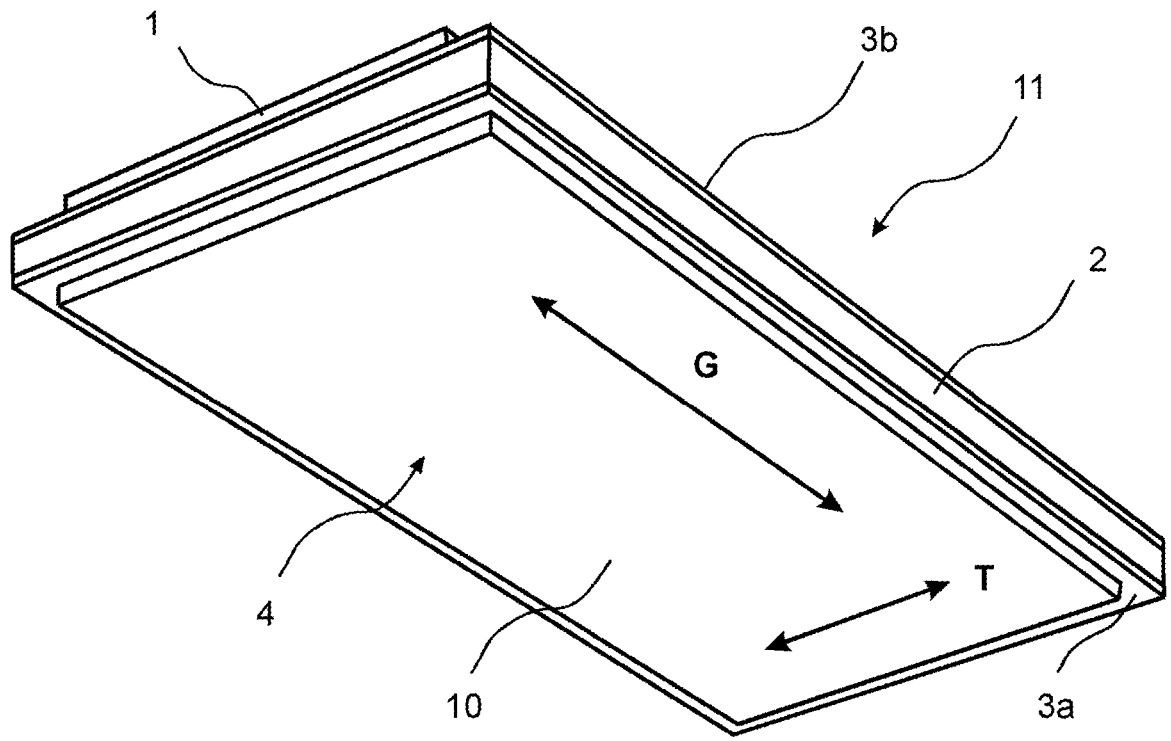
FIG. 1 discloses a perspective view of an embodiment of a building panel.

Specific embodiments of the invention will now be described with reference to the accompanying drawings.

This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims.

The different aspects, alternatives and embodiments of the invention disclosed herein can be combined with one or more of the other aspects, alternatives and embodiments described herein. Two or more aspects can be combined.

The objective of at least certain embodiments of the present invention is to provide a building panel, such as a floor panel, with a balancing layer, which has a better surface properties and/or lower costs than present known floorings.

At least some of these and other objects and advantages that will be apparent from the description.

In the following, the terms core and substrate will be used as substitutes.

Figure 3:
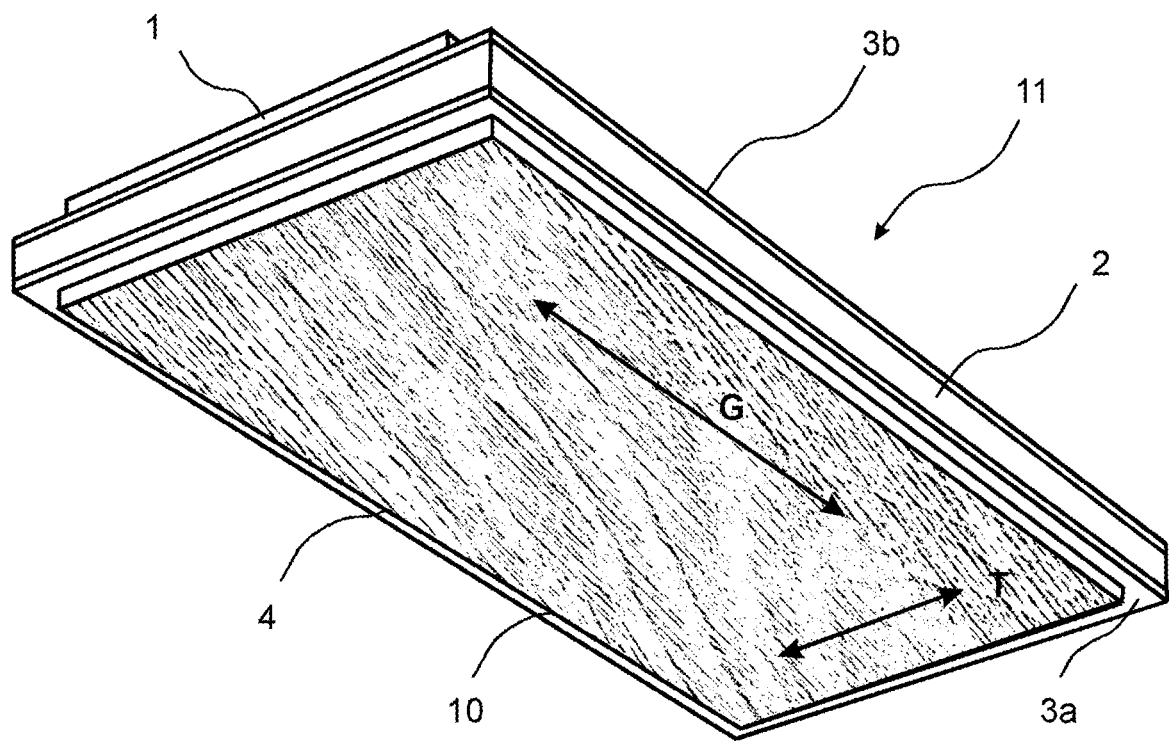
FIG. 3 discloses a perspective view of the embodiment in FIG. 1 wherein the first veneer has been illustrated in more details.

An embodiment of a building panel 11 will now be described with reference to FIG. 1, as well as with reference to FIG. 3 showing a first wood veneer in more details. FIG. 1 discloses a building panel comprising a surface layer 1, a second sub-layer 3b, a core 2, a first sub-layer 3a, and a balancing layer 4. A cross-section of the building panel 11 is shown in FIGS. 4D-E. A top surface 1a of the surface layer 1 is intended to form a visible surface of the building panel 11 when later installed. The first sub-layer 3a is arranged intermediate the balancing layer 4 and the core 2. The second sub-layer 3b is arranged intermediate the surface layer 1 and the core 2.

A lower surface 4b of the balancing layer 4 is intended to face the surface on which the building panel is to be installed. The first sub-layer 3a is arranged on a top surface 4a of the balancing layer 4. A lower surface 2b of the core 2 is arranged on the first sub-layer 3a. The second sub-layer 3b is arranged on a top surface 2b of the core 2. A lower surface 1b of the surface layer 1 is arranged on the second sub-layer 3b.

The balancing layer 4 may comprise a first wood veneer 10, or may be formed of a first wood veneer 10. The first wood veneer 10 has a grain direction G. In the embodiment shown in FIG. 1, the surface layer 1 may comprise a second wood veneer, or may be formed of a second wood veneer. In other embodiments, the surface layer 1 is selected from a decorative paper such as a resin impregnated decorative paper, a paper overlay, a powder based surface or a lacquer. In embodiments, the second sub-layer 3b may be excluded, or replace with an adhesive.

A direction parallel to the grain direction G and a direction transverse T to the grain direction are parallel to a plane formed by the lower surface 4b of the balancing layer 4.

The first and or the second wood veneer may be oak, maple, birch, walnut, ash, pine.

The first and/or the second veneer may be a rotary veneer, or a cut veneer. In one embodiment, the first veneer may be a cut veneer, and the second veneer may be a rotary veneer.

The first and the second veneer may be formed of more than one veneer element. The veneer elements may be stitched or glued together to form the first and/or the second veneer. If the first veneer is formed of more than one wood veneer, the wood veneers may be positioned such that the grain directions G of the wood veneers are aligned.

The first and/or the second sub-layer 3a, 3b comprises a binder. The binder may be a thermoplastic or thermosetting binder. The thermosetting binder may be an amino resin such as melamine formaldehyde resin or urea formaldehyde resin. The binder in the sub-layer may be a thermoplastic binder. The thermoplastic binder may be polyvinyl chloride (PVC), polyethylene (PE), polypropylene (PP), polyurethane (PU), polyvinyl alcohol (PVOH), polyvinyl butyral (PVB), and/or polyvinyl acetate (PVAc), or a combination thereof.

The first and/or sub-layer 3a, 3b may further comprise fillers. The filler may be organic or inorganic. The fillers are preferably in a powder form. The inorganic fillers may be selected from barium sulphate and calcium carbonate. The organic filler may be wood fibres such as cellulosic and/or lignocellulosic fibres.

The core 2 may be a wood-based board, for example, a wood-fibre based board such as MDF or HDF, or plywood, lamella core, or wood veneer. The core may be a Wood Plastic Composite (WPC). In an embodiment, the core may be a mineral composite board, a fibre cement board, a magnesium oxide cement board, a ceramic board, or a plastic board such as a thermoplastic board.

The building panel shown in FIG. 1 may be formed by applying the first sub-layer 3a on the top surface 4a of the balancing layer 4. The first sub-layer 3a may be stabilised by applying moisture, and optionally drying thereafter.

Alternatively, the first sub-layer 3a may be formed by applying the first sub-layer 3a on a lower surface 2b of the core 2. The first sub-layer 3a may be stabilised by applying moisture, and thereafter dried, for example by applying IR. After the sub-layer has been stabilised, the core 2 is turned and arranged on the balancing layer 4, or the balancing layer 4 is arranged on the first sub-layer 3a and the assembly is thereafter turned.

The first sub-layer 3a may be applied as a powder, as a liquid, or as a paste, on the core 2 or the balancing layer 4.

The first sub-layer 3a may be applied in an amount of 200-600 g/m2, preferably 300-500 g/m2 such as about 400 g/m2, such as about 430-470 g/sm2, such as 500-550 g/m2. The first sub-layer 3a may comprise the binder in an amount of 20-80 wt %, preferably in an amount of 40-60 wt % such as about 50 wt %.

The core 2 is arranged on the first sub-layer 3a. The second sub-layer 3b is applied on the top surface 2a of the core 2 facing away from the first sub-layer 3a. The second sub-layer 3b may be applied as a powder, as a liquid, or as a paste, on the core 2.

The second sub-layer 3b may be applied in an amount of 200-600 g/m2, preferably 300-500 g/m2 such as about 400 g/m2, such as about 430-470 g/m2, such as 500-550 g/m2. The second sub-layer 3b may comprise the binder in an amount of 20-80 wt %, preferably in an amount of 40-60 wt % such as about 50 wt %.

After the second sub-layer 3b has been applied on the core 2, the surface layer 1 is applied on the second sub-layer 3b.

The balancing layer 4 is positioned on the first sub-layer 3a, relative the core 2, such that the balancing layer 4 ends within the extension of the core 2, at least in a direction parallel to the grain direction G of the first wood veneer 10.

The balancing layer 4 has an extension in a direction parallel to the grain direction G of the first wood veneer 10 which is equal or less than the extension of the core 2 in the direction parallel to the grain direction G of the first wood veneer 10. Further, the balancing layer 4 does not protrude outside the core 2 in the direction parallel to the grain direction G of the first wood veneer 10. Consequently, the balancing layer 4 ends within the extension of the core 2 in the direction parallel to the grain direction G of the first wood veneer 10. The balancing layer 4 ends within the extension boundaries of the core 2 in the direction parallel to the grain direction G of the first wood veneer 10.

In an embodiment, an edge of the balancing layer 4 extending in a direction transverse T to the grain direction G of the first wood veneer 10 is aligned with an edge of the core 2 extending in the direction transverse T to the grain direction G of the first wood veneer 10. Such an edge of the balancing layer 4 may be a short edge of the balancing layer 4.

In another embodiment, like in the embodiment shown in FIG. 1, the core 2 protrudes beyond the balancing layer 4 in the direction parallel to the grain direction G of the first wood veneer 10 with a distance. The distance may be 0-10 mm, such as 0-5 mm. The distance may be 1 mm or more, preferably 2 mm or more.

In the embodiment shown in FIGS. 1 and 3, the balancing layer 4 is positioned relative the core 2 such that the balancing layer 4 has an extension in a direction parallel to the grain direction G of the first wood veneer 10 which is less than the extension of the core 2 in the direction parallel to the grain direction G of the first wood veneer 10. The core 2 extends beyond the balancing layer 4 in the direction parallel to the grain direction G of the first wood veneer 10.

In the embodiment shown in FIGS. 1 and 3, an extension of the balancing layer 4 in a direction transverse T the grain direction G of the first wood veneer 10 is equal or less than an extension of the core 2 in the direction transverse T the grain direction G of the first wood veneer 10. Further, the balancing layer 4 does not protrude outside the core 2 in the direction transverse T to the grain direction G of the first wood veneer 10. Consequently, the balancing layer 4 ends within the extension of the core 2 in the direction transverse T to the grain direction G of the first wood veneer 10.

In an embodiment, an edge of the balancing layer 4 extending in a direction parallel to the grain direction G of the first wood veneer 10 is aligned with an edge of the core 2 extending in the direction parallel to the grain direction G of the first wood veneer 10. Such an edge may be a long edge of the balancing layer 4.

In another embodiment, like in the embodiment shown in FIGS. 1 and 3, the core 2 protrudes beyond the balancing layer 4 in the direction transverse T to the grain direction G of the first wood veneer 10 with a distance. The distance may be 0-10 mm, such as 0-5 mm. The distance may be 1 mm or more, preferably 2 mm or more.

In the embodiment shown in FIGS. 1 and 3, the balancing layer 4 is positioned relative the core 2 such that the balancing layer 4 has an extension in a direction transverse T to the grain direction G of the first wood veneer 10 which is less than the extension of the core 2 in the direction transverse T to the grain direction G of the first wood veneer 10. The core 2 extends beyond the balancing layer 4 in the direction transverse T to the grain direction G of the first wood veneer 10.

In the embodiment shown in FIGS. 1 and 3, the balancing layer 4 is positioned such that the grain direction G of the first wood veneer 10 is parallel to a longitudinal direction of the surface layer 1. The longitudinal direction of the surface layer 1 is extending in direction parallel to the grain direction G of the first wood veneer 10.

In the embodiment shown in FIGS. 1 and 3, the edge of the balancing layer 4 extending in a direction transverse T to the grain direction G of the first wood veneer 10 is a short edge of the balancing layer 4. The edge of the balancing layer 4 extending in a direction parallel to the grain direction G of the first wood veneer 10 is a long edge of the balancing layer 4 in the embodiment shown in FIGS. 1 and 3.

In the embodiment shown in FIGS. 1 and 3, the edge of the surface layer 1 extending in a direction transverse T to the grain direction G of the first wood veneer 10 is a short edge of the surface layer 1. The edge of the surface layer 1 extending in a direction parallel to the grain direction G of the first wood veneer 10 is a long edge of the surface layer 1 in the embodiment shown in FIGS. 1 and 3.

When the balancing layer 4 is positioned on the second sub-layer 3, heat and pressure is applied on the assembly formed by the balancing layer 4, the first sub-layer 3*a*, the core 2, the second sub-layer 3*b*, and the surface layer 1 in order to form the building panel 11. Pressure applied may be at least 15 bar. The pressure may be applied during at least 15 s, preferably during at least 30 s, more preferably during at least 45 s. The temperature may be at least 150° C., such as 150-200° C. Heat and pressure may be applied in a short cycle press, or in continuous press.

The building panel 11 thereby formed may form an individual plank. The building panel 11 may be provided with a mechanical locking system at its long and/or short edges.

Alternatively, the building panel 11 may be divided into planks. Each plank may be provided with a mechanical locking system at its long and/or short edges.

Figure 2:
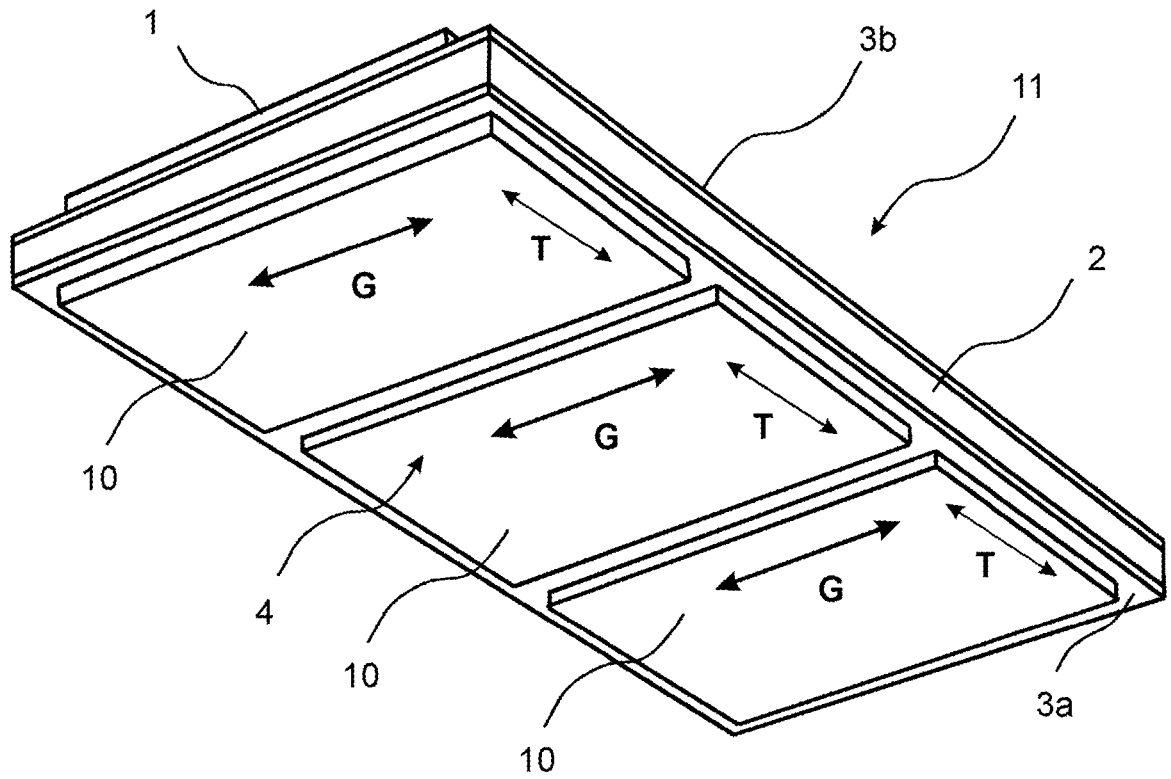
FIG. 2 discloses a perspective view an embodiment of a building panel.

An embodiment will now be described with reference to FIG. 2. FIG. 2 discloses a building panel comprising a surface layer 1, a second sub-layer 3*b*, a core 2, a first sub-layer 3*a*, and a balancing layer 4. A cross-section of the building panel 11 is shown in FIGS. 4C-D. A top surface 1*a* of the surface layer 1 is intended to form a visible surface of the building panel 11 when later installed. The first sub-layer 3*a* is arranged intermediate the balancing layer 4 and the core 2. The second sub-layer 3*b* is arranged intermediate the surface layer 1 and the core 2.

A lower surface 4*b* of the balancing layer 4 is intended to face the surface on which the building panel is to be installed. The first sub-layer 3*a* is arranged on a top surface 4*a* of the balancing layer 4. A lower surface 2*b* of the core 2 is arranged on the first sub-layer 3*a*. The second sub-layer 3*b* is arranged on a top surface 2*b* of the core 2. A lower surface 1*b* of the surface layer 1 is arranged on the second sub-layer 3*b*.

In the embodiment shown in FIG. 2, the balancing layer 4 comprises several first wood veneers 10. The first wood veneer 10 each has a grain direction G. In the embodiment shown in FIG. 3, the first wood veneers 10 are arranged such that their grain directions G are parallel.

A direction parallel to the grain direction G and a direction transverse T to the grain direction are parallel to a plane formed by the lower surface 4*b* of the balancing layer 4.

In the embodiment shown in FIG. 2, the surface layer 1 comprises a second wood veneer, or may be formed of a second wood veneer. In other embodiments, the surface layer 1 is selected from a decorative paper such as a resin impregnated decorative paper, a paper overlay, a powder based surface or a lacquer. In embodiments, the second sub-layer 3b may be excluded.

The first and or the second wood veneer may be oak, maple, birch, walnut, ash, pine.

The first and/or the second veneer may be a rotary veneer, or a cut veneer. In the embodiment shown in FIG. 2, the first wood veneers may be a cut veneer, and the second wood veneer may be a rotary veneer.

The second veneer may be formed of more than one veneer element. The veneer elements may be stitched or glued together to form the first and/or the second veneer.

The first and/or the second sub-layer 3a comprises a binder. The binder may be a thermoplastic or thermosetting binder. The thermosetting binder may be an amino resin such as melamine formaldehyde resin or formaldehyde resin. The binder in the sub-layer may be a thermoplastic binder. The thermoplastic binder may be polyvinyl chloride (PVC), polyethylene (PE), polypropylene (PP), polyurethane (PU), polyvinyl alcohol (PVOH), polyvinyl butyral (PVB), and/or polyvinyl acetate (PVAc), or a combination thereof.

The sub-layer 3a may further comprise fillers. The filler may be organic or inorganic. The fillers are preferably in a powder form. The inorganic fillers may be selected from barium sulphate and calcium carbonate. The organic filler may be wood fibres such as cellulosic and/or lignocellulosic fibres.

The core 2 may be a wood-based board, for example, a wood-fibre based board such as MDF or HDF, or plywood, lamella core, or wood veneer. The core may be a Wood Plastic Composite (WPC). In an embodiment, the core may be a mineral composite board, a fibre cement board, a magnesium oxide cement board, a ceramic board, or a plastic board such as a thermoplastic board.

The building panel shown in FIG. 2 may be formed by applying the first sub-layer 3a on the balancing layer 4. The first sub-layer 3a may be stabilised by applying moisture, and optionally drying thereafter.

Alternatively, the first sub-layer 3a may be formed by applying the first sub-layer 3a on the core 2. The first sub-layer 3a may be stabilised by applying moisture, and thereafter dried, for example by applying IR. After the first sub-layer 3a has been stabilised, the core 2 is turned and arranged on the balancing layer 4, or the balancing layer 4 is applied on the first sub-layer 3a and thereafter turned.

The first sub-layer 3a may be applied as a powder, as a liquid, or as a paste, on the core 2 or the balancing layer 4

The first sub-layer 3a may be applied in an amount of 200-600 g/m2, preferably 300-500 g/m2 such as about 400 g/m2, such as about 430-470 g/sm2, such as 500-550 g/m2. The first sub-layer 3a may comprise the binder in an amount of 20-80 wt %, preferably in an amount of 40-60 wt % such as about 50 wt %.

In the embodiment shown in FIG. 2, several first wood veneers 10 are arranged on the first sub-layer 3a for forming the balancing layer 4. The first wood veneers 10 of the balancing layer 4 is positioned on the first sub-layer 3a, relative the core 2, such that each first wood veneer 10, and thereby the balancing layer 4, ends within the extension of the core 2, at least in a direction parallel to the grain direction G of the first wood veneers 10.

The core 2 is arranged on the first sub-layer 3a. The second sub-layer 3b is applied on a top surface 2a of the core 2 facing away from the first sub-layer 3a. The second sub-layer 3b may be applied as a powder, as a liquid, or as a paste, on the core 2.

The second sub-layer 3b may be applied in an amount of 200-600 g/m2, preferably 300-500 g/m2 such as about 400 g/m2, such as about 430-470 g/m2, such as 500-550 g/m2. The second sub-layer 3b may comprise the binder in an amount of 20-80 wt %, preferably in an amount of 40-60 wt % such as about 50 wt %.

After the second sub-layer 3b has been applied on the core 2, the surface layer 1 is applied on the second sub-layer 3b.

The first wood veneers 10, and thereby the balancing layer 4, has an extension in a direction parallel to the grain direction G of the first wood veneers 10 which is equal or less than the extension of the core 2 in the direction parallel to the grain direction G of the first wood veneers 10. Further, each first wood veneer 10, and thereby the balancing layer 4, does not protrude outside the core 2 in the direction parallel to the grain direction G of the first wood veneers 10. Consequently, each of the first wood veneer 10, and thereby the balancing layer 4, ends within the extension of the core 2 in the direction parallel to the grain direction G of the first wood veneers 10.

In an embodiment, an edge of each first wood veneer 10 extending in a direction transverse T to the grain direction G of the first wood veneers 10 is aligned with an edge of the core 2 extending in the direction transverse T to the grain direction G of the first wood veneers 10. Such an edge of the first wood veneers 10 may be a short edge of the first wood veneers 10.

In another embodiment, like in the embodiment shown in FIG. 2, the core 2 protrudes beyond each first wood veneer 10, and thereby the balancing layer 4 in the direction parallel to the grain direction G of the first wood veneer with a distance. The distance may be 0-10 mm, such as 0-5 mm. The distance may be 1 mm or more, preferably 2 mm or more.

In the embodiment shown in FIG. 2, each first wood veneer 10, and thereby the balancing layer 4, is positioned on the second sub-layer 3b, relative the core 2, such that each first wood veneer 10, and thereby the balancing layer 4, has an extension in a direction parallel to the grain direction G of the first wood veneers 10 which is less than the extension of the core 2 in the direction parallel to the grain direction G of the first wood veneers 10. The core 2 extends beyond each first wood veneer 10, and thereby the balancing layer 4, in the direction parallel to the grain direction G of the first wood veneers 10.

In the embodiment shown in FIG. 2, an extension of each first wood veneer 10, and thereby the balancing layer 4, in a direction transverse T the grain direction G of the first wood veneers 10 is equal or less than an extension of the core 2 in the direction transverse T the grain direction G of the first wood veneers 10. Further, each first wood veneers 10, and thereby the balancing layer 4, does not protrude outside the core 2 in the direction transverse T to the grain direction G of the first wood veneers 10. Consequently, each first wood veneer 10, and thereby the balancing layer 4, ends within the extension of the core 2 in the direction transverse T to the grain direction G of the first wood veneers 10.

In an embodiment, an edge of each first wood veneer 10 extending in a direction parallel to the grain direction G of the first wood veneer is aligned with an edge of the core 2 extending in the direction parallel to the grain direction G of the first wood veneers 10. Such an edge may be a long edge of the first wood veneers.

In another embodiment, like in the embodiment shown in FIG. 2, the core 2 protrudes beyond the first veneer in the direction transverse T to the grain direction G of the first wood veneer with a distance. The distance may be 0-10 mm, such as 0-5 mm. The distance may be 1 mm or more, preferably 2 mm or more.

In the embodiment shown in FIG. 2, each first wood veneer, and thereby the balancing layer 4, is positioned relative the core 2 such that each first wood veneer 10, and thereby the balancing layer 4, has an extension in a direction transverse T to the grain direction G of the first wood veneers 10 which is less than the extension of the core 2 in the direction transverse T to the grain direction G of the first wood veneers 10. The core 2 extends beyond each first wood veneer 10, and thereby the balancing layer 4, in the direction transverse T to the grain direction G of the first wood veneers 10.

In the embodiment shown in FIG. 2, each first wood veneer is positioned such that the grain direction G of the first wood veneers 10 is transverse to a longitudinal direction of the surface layer 1. The longitudinal direction of the surface layer 1 is extending in direction transverse T to the grain direction G of the first wood veneers 10.

In the embodiment shown in FIG. 2, the edge of each first wood veneer, in a direction transverse T to the grain direction G of the first wood veneer is a short edge of each first wood veneer. The edge of each first wood veneer extending in a direction parallel to the grain direction G of the first wood veneer is a long edge of each first wood veneer 1 in the embodiment shown in FIG. 2.

In the embodiment shown in FIG. 2, the edge of the surface layer 1 extending in a direction parallel to the grain direction G of the first wood veneer is a short edge of the surface layer 1. The edge of the surface layer 1 extending in a direction transverse T to the grain direction G of the first wood veneers is a long edge of the surface layer 1 in the embodiment shown in FIG. 3.

When the balancing layer 4 is positioned on the first sub-layer 3a, heat and pressure is applied on the assembly formed by the balancing layer 4, the first sub-layer 3a, the core 2, the second sub-layer 3b, and the surface layer 1 in order to form the building panel 11. Pressure applied may be at least 15 bar. The pressure may be applied during at least 15 s, preferably during at least 30 s, more preferably during at least 45 s. The temperature may be at least 150° C., such as 150-200° C. Heat and pressure may be applied in a short cycle press, or in continuous press.

The building panel 11 thereby formed may form an individual plank. The building panel 11 may be provided with a mechanical locking system at its long and/or short edges.

Alternatively, the building panel 11 may be divided into planks. For example, the building panel 11 may be divided between two wood veneers 10. Each plank may be provided with a mechanical locking system at its long and/or short edges.

It is to be noted that the first wood veneers 10 may not be arranged with their grain directions G parallel. In such an embodiment, each first wood veneer 10 is positioned such that the extension of each wood veneer 10 in a direction parallel to each grain direction G is equal or less than the extension of the core in that direction. All aspects described in relation to a first veneer above are applicable to each first veneer 10 if several first veneers 10 are provided.

FIG. 3 discloses the same embodiment as in FIG. 1. In FIG. 3, the first wood veneer 10 is visualised by a design of a real wood veneer, illustrating the grain direction G.

FIG. 4C discloses an embodiment wherein the core 2, the first sub-layer 3a, the second sub-layer 3b shown in FIGS. 1-3 have been replaced by the first sub-layer 3a only. The first sub-layer 3a, the balancing layer 4 and the surface layer are of the type described above with reference to FIGS. 1-3. The first sub-layer 3a may have been applied on the top surface 4a of the balancing layer 4. In the embodiment in FIG. 4C, the balancing layer 4 has an extension in a direction parallel to the grain direction G of the first wood veneer 10 which is equal or less than the extension of the first sub-layer 3a in the direction parallel to the grain direction G of the first wood veneer 10. Further, the balancing layer 4 does not protrude outside the first sub-layer 3a in the direction parallel to the grain direction G of the first wood veneer 10. Consequently, the balancing layer 4 ends within the extension of the first sub-layer 3a in the direction parallel to the grain direction G of the first wood veneer 10. The balancing layer 4 ends within the extension boundaries of the first sub-layer 3a in the direction parallel to the grain direction G of the first wood veneer 10.

In an embodiment shown in FIG. 4C, an edge of the balancing layer 4 extending in a direction transverse T to the grain direction G of the first wood veneer 10 is aligned with an edge of the first sub-layer 3a extending in the direction transverse T to the grain direction G of the first wood veneer 10. Such an edge of the balancing layer 4 may be a short edge of the balancing layer 4.

In another embodiment, the first sub-layer 3a protrudes beyond the balancing layer 4 in the direction parallel to the grain direction G of the first wood veneer 10 with a distance. The distance may be 0-10 mm, such as 0-5 mm. The distance may be 1 mm or more, preferably 2 mm or more.

In the embodiment shown in FIG. 4C, the balancing layer 4 is positioned relative the first sub-layer 3a such that the balancing layer 4 has an extension in a direction parallel to the grain direction G of the first wood veneer 10 which is less than the extension of the first sub-layer 3a in the direction parallel to the grain direction G of the first wood veneer 10. The first sub-layer 3a extends beyond the balancing layer 4 in the direction parallel to the grain direction G of the first wood veneer 10.

In the embodiment shown in FIG. 4C, an extension of the balancing layer 4 in a direction transverse T the grain direction G of the first wood veneer 10 is equal or less than an extension of the first sub-layer 3a in the direction transverse T the grain direction G of the first wood veneer 10. Further, the balancing layer 4 does not protrude outside the first sub-layer 3a in the direction transverse T to the grain direction G of the first wood veneer 10. Consequently, the balancing layer 4 ends within the extension of t the first sub-layer 3a in the direction transverse T to the grain direction G of the first wood veneer 10.

In an embodiment shown in FIG. 4C, an edge of the balancing layer 4 extending in a direction parallel to the grain direction G of the first wood veneer 10 is aligned with an edge of the first sub-layer 3a extending in the direction parallel to the grain direction G of the first wood veneer 10. Such an edge may be a long edge of the balancing layer 4.

In another embodiment, the first sub-layer 3a protrudes beyond the balancing layer 4 in the direction transverse T to the grain direction G of the first wood veneer 10 with a distance. The distance may be 0-10 mm, such as 0-5 mm. The distance may be 1 mm or more, preferably 2 mm or more.

In the embodiment shown in FIG. 4C, the balancing layer 4 is positioned relative the first sub-layer 3a such that the balancing layer 4 has an extension in a direction transverse T to the grain direction G of the first wood veneer 10 which is less than the extension of the first sub-layer 3a in the direction transverse T to the grain direction G of the first wood veneer 10. The first sub-layer 3a extends beyond the balancing layer 4 in the direction transverse T to the grain direction G of the first wood veneer 10.

In the embodiment shown FIG. 4C, the balancing layer 4 is positioned such that the grain direction G of the first wood veneer 10 is parallel to a longitudinal direction of the surface layer 1. The longitudinal direction of the surface layer 1 is extending in direction parallel to the grain direction G of the first wood veneer 10.

In the embodiment shown in FIG. 4C, the edge of the balancing layer 4 extending in a direction transverse T to the grain direction G of the first wood veneer 10 is a short edge of the balancing layer 4. The edge of the balancing layer 4 extending in a direction parallel to the grain direction G of the first wood veneer 10 is a long edge of the balancing layer 4 in the embodiment shown in FIG. 4C.

In the embodiment shown in FIG. 4C, the edge of the surface layer 1 extending in a direction transverse T to the grain direction G of the first wood veneer 10 is a short edge of the surface layer 1. The edge of the surface layer 1 extending in a direction parallel to the grain direction G of the first wood veneer 10 is a long edge of the surface layer 1 in the embodiment shown in FIG. 4C.

In all embodiments, the surface layer 1 may be positioned relative the balancing layer 4 such that that an extension of the surface layer 1 in a direction parallel to a grain direction of the second wood veneer of the surface layer 1 is equal or less than an extension of the balancing layer 4 in the direction parallel to the grain direction of the second wood veneer of the surface layer 1. The extension of the surface layer 1 in the direction parallel to the grain direction of the second wood veneer of the surface layer 1 may be within the extension of the balancing layer 4 in the direction parallel to the grain direction of the second wood veneer of the surface layer 1. The surface layer 1 may not protrude beyond the balancing layer 4 in the direction parallel to the grain direction of the second wood veneer of the surface layer 1. An edge of the surface layer 1 transverse to the grain direction of the second wood veneer may be aligned with an edge of the balancing layer 4 in the direction transverse to the grain direction of the second wood veneer of the surface layer 1.

The surface layer 1 may be positioned relative the balancing layer 4 such that that an extension of the surface layer 1 in a direction transverse to a grain direction of the second wood veneer of the surface layer 1 is equal or less than an extension of the balancing layer 4 in the direction transverse to the grain direction of the second wood veneer of the surface layer 1. The extension of the surface layer 1 in the direction transverse to the grain direction of the second wood veneer of the surface layer 1 may be within the extension of the balancing layer 4 in the direction transverse to the grain direction of the second wood veneer of the surface layer 1. The surface layer 1 may not protrude beyond the balancing layer 4 in the direction transverse to the grain direction of the second wood veneer of the surface layer 1. An edge of the surface layer 1 parallel to the grain direction of the second wood veneer may be aligned with an edge of the balancing layer 4 in the direction parallel to the grain direction of the second wood veneer of the surface layer 1.

FIGS. 4A-E illustrates a building panel according to the invention.

Figure 4A:
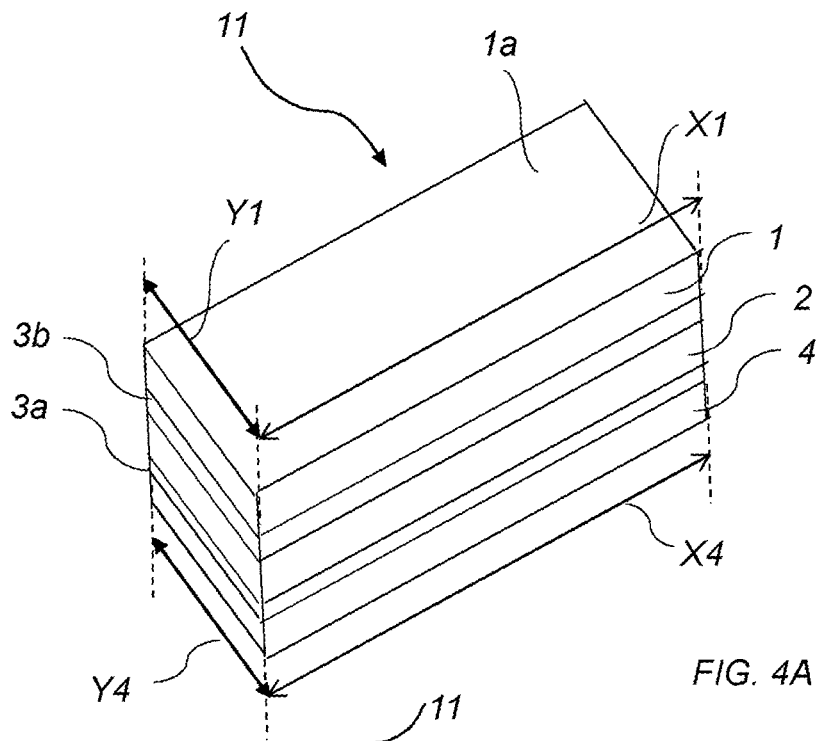
FIG. 4A discloses a perspective view of an embodiment of a building panel.
Figure 4B:
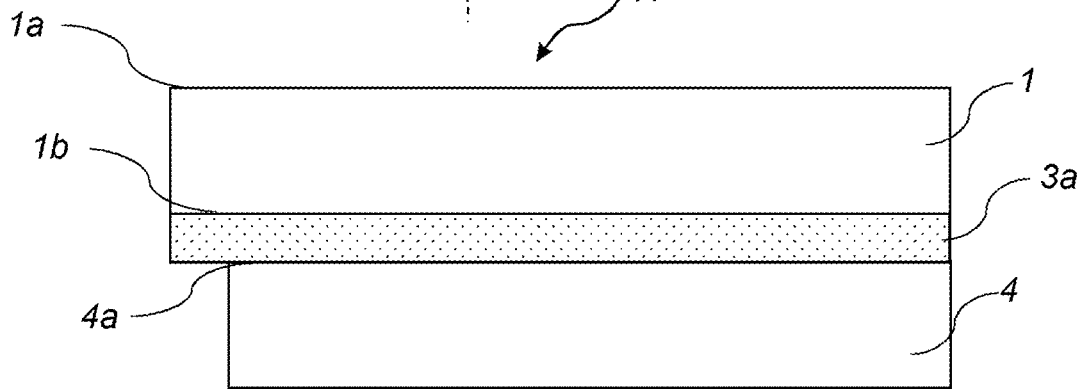
FIGS. 4B-E illustrates cross-sections of embodiments of a building panel.
Figure 4C:
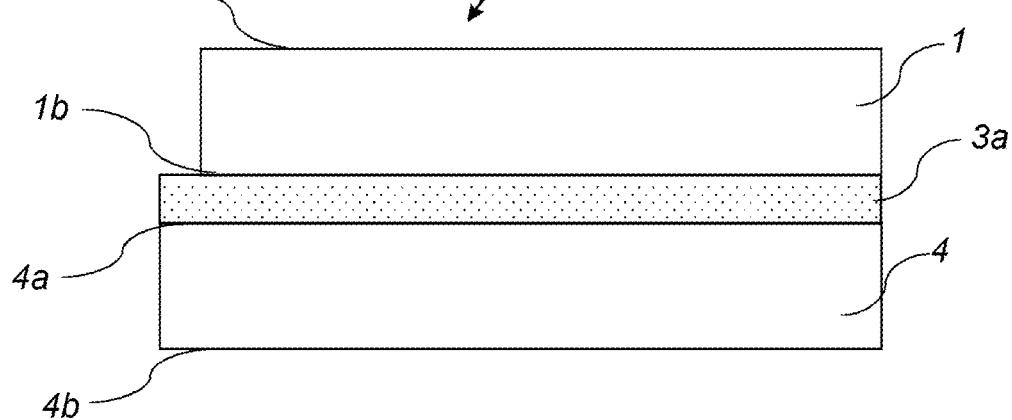
Figure 4D:
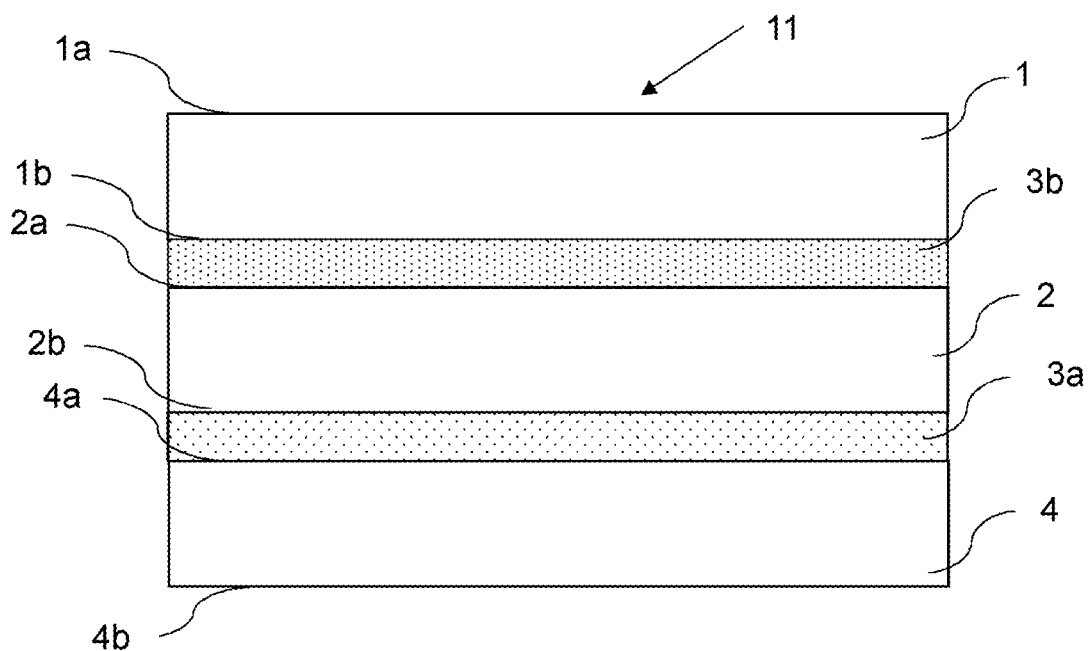
Figure 4E:
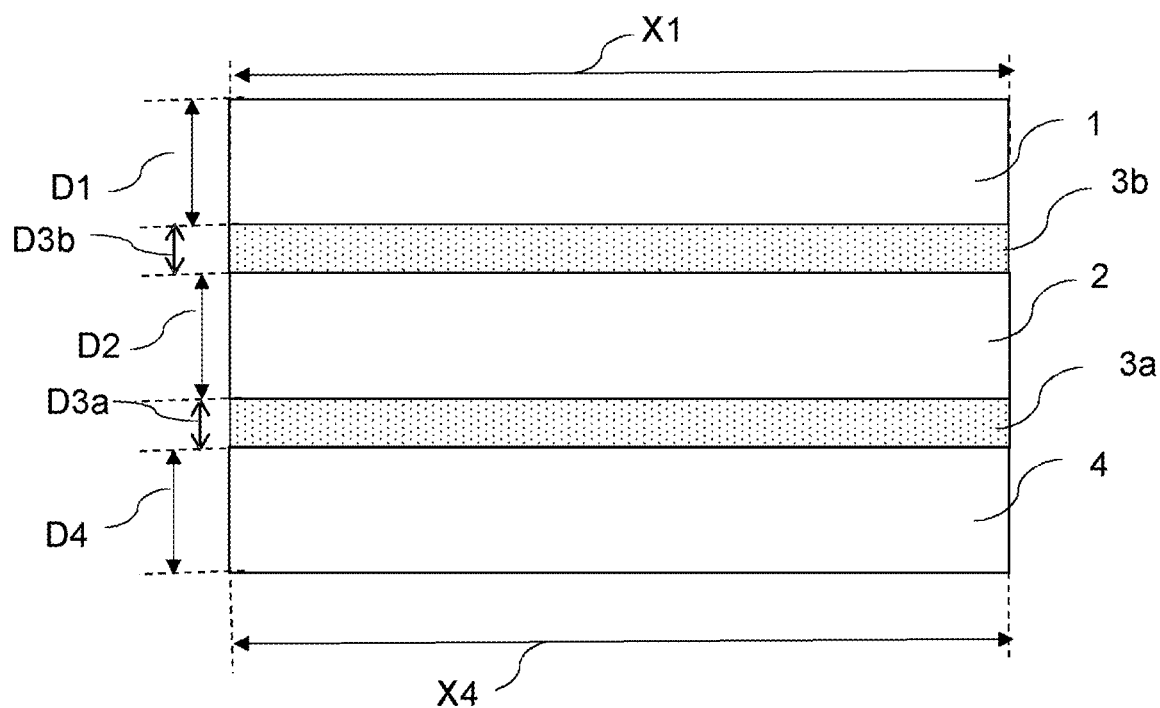

FIG. 4A shows a perspective view of an embodiment, wherein the building panel comprises a surface layer, a substrate, a balancing layer and a first and a second sub-layer. The longitudinal length (X2) and latitudinal length (X2) of the substrate (2) and the longitudinal length (Y4) and latitudinal length (Y4) of the balancing layer (4) are shown. FIG. 4B shows a side view of an edge of the panel, illustrating a positioning of the balancing layer relative substrate (2) in accordance with the invention. FIG. 4D shows a side view of a short side of a building panel according to an embodiment of the invention, wherein the building panel comprises a surface layer (1), a balancing layer (4) and a first sub-layer (3a), a substrate (2) and adhesive means (3b). FIG. 4E shows a side view of a long side of a building panel according to an embodiment of the invention, wherein the building panel comprises a surface layer (1), a balancing layer (4) and a first sub-layer (3a), a substrate (2) and adhesive means (3b).

Figure 5:
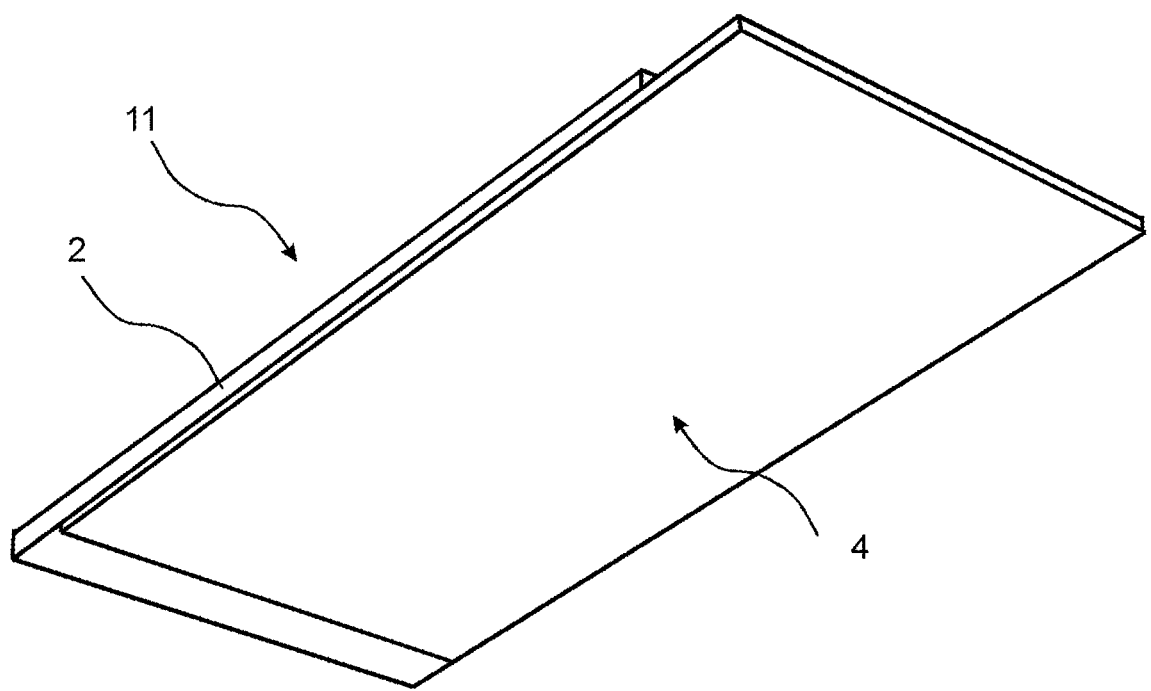
FIG. 5 shows positioning of a core, in this case a board, relative a balancing layer comprising a first veneer.

FIG. 5 shows positioning of substrate (A), in this case a board relative a balancing veneer (B), which is placed with a protrusion on one short edge and an indentation on the other, relative the substrate.

Figure 6A:
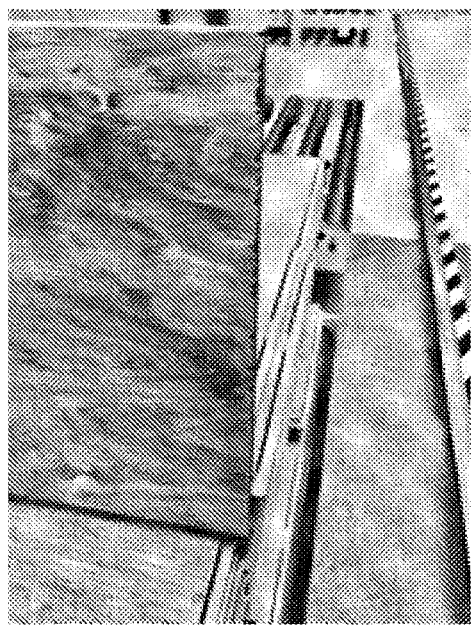
FIG. 6A shows an edge of a building panel after pressing with incorrect positioning of the balancing layer relative the core.
Figure 6B:
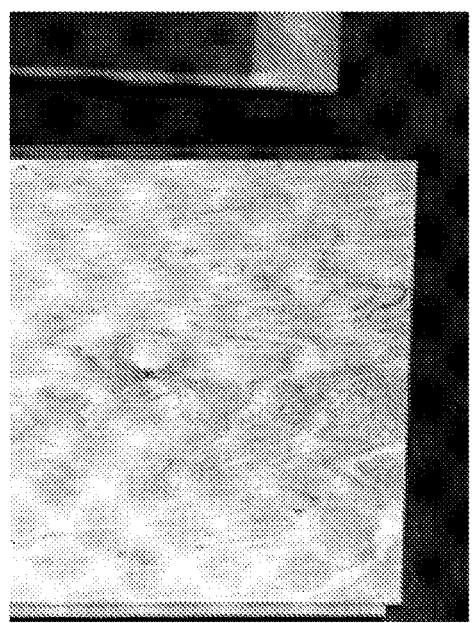
FIG. 6B shows the edge of a building panel after pressing with correct positioning of the balancing layer relative the core.

FIG. 6B shows the edge of a panel after pressing with the correct positioning of the balancing layer (4) relative the substrate (2). FIG. 6A shows the edge of the panel after pressing with incorrect positioning of the balancing layer relative the substrate (2).

An incorrect placing of the balancing layer (4) relative the substrate (2) typically leads to an attachment of the balancing layer to a substrate, which does not handle well transportation and cutting of the ready-made building panel. The balancing layer tends to disconnect from the substrate at the edges (FIG. 6A), in particular when the ready panel is transported or mounted on the target substrate, such as floor. In such case the panel with the bad attachment of the balancing layer shall be put to waste. This also increases the production costs.

Without wish to be bound by any theory the inventors contemplated that wrong positioning gives the binder a way to flow horizontally and climb along the veneer outside of the core (2), instead of vertically. Vertical penetration is desired for penetrating both the board and veneer in order to provide a desired colouring pattern and sufficient adhesion.

This problem is solved by a correct positioning of the balancing layer relative substrate, as disclosed in this application (FIG. 6B).

In an embodiment, it is disclosed a building panel (11). The building panel comprises a balancing layer (4), said balancing layer having at least one longitudinal edge and at least one latitudinal edge, wherein the longitudinal edge has a longitudinal length (X4) and a latitudinal edge has a latitudinal length (Y4), a top surface (4a) and a bottom surface (4b).

The building panel is essentially of a rectangular shape. Therefore, a longitudinal edge and a latitudinal edge of the building panel and of each layer, such as balancing layer, consequently are perpendicular to each other. Furthermore, the building panel and each layer respectively such as balancing layer, has two longitudinal and two latitudinal edges. Two longitudinal edges are the edges opposite of each other. Accordingly, two latitudinal edges are the edges opposite to each other of each layer and of a building panel.

In an embodiment, a top surface (4a) of the balancing layer (4) is facing a direction opposite to the bottom surface (4a) of the balancing layer (4).

In an embodiment, the balancing layer is a wood veneer.
The balancing layer in accordance with some embodiments may also be a stone veneer, or a paper or a cork.

When the balancing layer is a wood veneer, the wood veneer may be a first wood veneer in accordance with the description.

A first sub-layer (3a) comprises a first binder and arranged on the top surface (4a) of the balancing layer (4).

In an embodiment, a first sub-layer (3a) may comprise or consist of a binder.

A substrate (2) is arranged on top of the first sub-layer (3a), said substrate (2) having a longitudinal edge and a latitudinal edge, the longitudinal edge has a longitudinal length (X2) and a latitudinal edge has a latitudinal length (Y2), a top surface (2a) and a bottom surface (2b).

Similar to the balancing layer (4) a substrate (2) has two longitudinal edges, opposite of each other and two latitudinal edges opposite to each other.

The bottom surface (4a) of the balancing layer (4) is configured to be mounted on a target surface suitable for covering with the building panel (11) and the top surface (2b) of the substrate (2) is configured to be connected to a surface layer (1).

The balancing layer may comprise a low-quality veneer. The building panel may be provided with a thinner veneer than known building panels with veneer, since the first and/or the second sub-layer reinforces the veneer.

The top surface (4a) of the balancing layer (4) is a surface facing the direction opposite to the bottom surface (4b).

In an embodiment, the balancing layer may be the same thickness as the surface layer, or may differ in thickness from the surface layer.

The longitudinal length (X4) of the balancing layer (4) is essentially equal or less than the longitudinal length (X2) of the substrate (2); and the latitudinal length (Y4) of the balancing layer (4) is essentially equal or less than the latitudinal length (Y2) of the substrate (2).

When the longitudinal length of the substrate (2) is equal to the longitudinal length of the balancing layer (4), the corresponding longitudinal edges of the balancing layer and the substrate are aligned with each other.

In an embodiment when the latitudinal length of the substrate (2) is equal to the latitudinal length of the balancing layer (4) the latitudinal edges of the balancing layer and the substrate are aligned with each other.

Said building panel further comprises a surface layer (1) connected to the top surface (2a) by adhesive means (3b).

Adhesive means are any substance that has adhesive properties and may attach a substrate to the surface layer. A choice of adhesive means largely depends on a nature of a substrate (2) and a surface layer (1).

The balancing layer (4) is positioned in the assembled building panel such that the longitudinal and the latitudinal edges of the balancing layer (4) do not extend beyond the corresponding longitudinal and latitudinal edges of the substrate (2).

In an embodiment, the building panel (11) is essentially rectangular.

Size of the building panel may vary. The building panel in some embodiments is as large as 2400 mm×24000 mm. The panel can be cut to smaller pieces after assembling and prior to mounting onto a target surface.

In an embodiment, the balancing layer (4) is positioned in the assembled building panel such that at least the latitudinal edge of the balancing layer (4) is off-set relative the corresponding latitudinal edge of the substrate (2) in a direction of an opposite latitudinal edge of the balancing layer (4) by 1 mm or more, such as by 2 mm or more.

The balancing layer (4) is positioned in the assembled building panel (11) such that at least the longitudinal edge of the balancing layer (4) is off-set relative the corresponding longitudinal edge of the substrate (2) in a direction of an opposite longitudinal edge of the balancing layer (4) by 1 mm or more, such as by 2 mm or more.

By off-set as define above it is meant that the balancing layer (4) should never be placed with a negative offset relative the substrate (2). If the substrate's (2) top surface (2a) area was to be projected onto the balancing layer, the balancing layer shall be completely covered by the substrate. No edge of the substrate (2) should fall shorter than the edges of the balancing layer (4) in any direction, as it will project a pressure difference in the building panel during pressing and this will show as a poor-quality binding of the balancing layer (4) to the substrate (2). This bad binding of the substrate to the balancing layer is particularly apparent at the edges (see FIG. 3)

The substrate may be a wood fibre based core such as HDF board, MDF board, wood plastic composite, and plywood.

In some embodiments, the substrate (2) may be selected from plastic boards, stone plastic composite.

Any substrate for the purpose of serving as a board for attaching to the balancing layer and a surface layer is suitable.

Preferably, the substrate is a pre-fabricated substrate.

The substrate has a thickness D2 in a pressed building panel of between 1 and 15 mm. The substrate is typically a thick board. A thickness of the substrate in a pressed building panel, such as a cured panel, wherein all the layers are connected to each other is between 2 mm and 15 mm. In an embodiment, a thickness D of the entire pressed building panel is between 1 mm and 20 mm. The substrate may have a thickness D2 after pressing between 3 mm and 11 mm, such as between 4 mm and 10 mm, such as between 5 mm and 9 mm, such as between 6 and 8 mm. The thickness is measured in a panel, after heat and pressure has been applied to all layers. Thus, the panel has been at least partially cured.

In an embodiment, the surface layer (1) may have a thickness D1 after pressing of between 0.2 and 2.5 mm, such as between 0.25 mm and 2 mm, such as about 0.5 mm, such as about 1 mm, such as about 1.5 mm.

In an embodiment, the balancing layer (4) has a thickness D4 after pressing of between 0.2 mm and 2.5 mm, such as between 0.25 mm and 2 mm, such as about 0.5 mm, such as about 1 mm, such as about 1.5 mm.

The thickness is defined in the cured building panel, such as a pressed building panel.

The surface layer may be selected from a second wood veneer, a paper overlay, a powder based surface layer or a lacquer.

The surface layer may be a "décor layer", such as a layer having decorative properties.

The first and/or the second wood veneer may be selected from hard or soft wood, dark or light coloured wood.

In an embodiment, the first and/or the second wood veneer may be selected from oak, maple, birch, walnut, ash, fir and pine.

The adhesive (3b) is selected from a second binder, a second sub-layer (3b) comprising a second binder or a glue.

The sub-layer (3a) and or (3b) may be applied in an amount of 200-600 g/m2, preferably 300-500 g/m2 such as about 400 g/m2, such as about 430-470 g/sm2, such as 500-550 g/m2. The sub-layer 3a and/or 3b may comprise the binder in an amount of 20-80 wt %, preferably in an amount of 40-60 wt % such as about 50 wt %.

The binder in the first and/or second sub-layer may be an amino resin, such as melamine formaldehyde resin, urea formaldehyde resin, phenol formaldehyde resin, or a combination thereof. The binder may be wood mastic, wood filler or any other type of putty-like paste.

The first and/or second binder may be in powder form.

In an embodiment, the first sub-layer (3a) and/or the second sub-layer (3b) may comprise inorganic fillers.

The fillers are preferably in a powder form. The inorganic fillers may be selected from barium sulphate and calcium carbonate.

The first and/or second binder may be a thermoplastic or thermosetting binder.

The binder in the sub-layer may be a melamine resin. The binder in the sub-layer may be an amino resin, such as melamine formaldehyde resin, urea formaldehyde resin, phenol formaldehyde resin, or a combination thereof.

The binder in the sub-layer may be a thermoplastic binder. The thermoplastic binder may be polyvinyl chloride (PVC), polyethylene (PE), polypropylene (PP), polyurethane (PU), polyvinyl alcohol (PVOH), polyvinyl butyral (PVB), and/or polyvinyl acetate (PVAc), or a combination thereof.

The sub-layer may be substantially or completely formaldehyde free.

The first sub-layer 3a and/or the second sub-layer 3b may be a pre-pressed layer, wherein the binder has not completely cured during the pre-pressing.

The first and/or second sub-layer (3a, 3b) may comprise a foaming agent.

Some other fillers may be in a first and/or second sub-layer (3a, 3b). There may be additional organic particles or fibres, for example wood fibres or particles, or mineral particles or fibres. The wood particles may be lignocellulosic particles and/or cellulosic particles. The wood particles may be at least partially bleached. The fillers may be rice, straw, corn, jute, linen, flax, cotton, hemp, bamboo, bagasse or sisal particles or fibres. The filler may be starch such as maize starch, potato starch, etc. Preferably, any of the fillers are in the powder form.

In an embodiment, the first sub-layer (3a) and/or the second sub-layer (3b) comprise fibres, preferably wood fibres.

In an embodiment, the first binder is the same or different from the second binder.

In an embodiment, the first binder and/or second binder is a melamine formaldehyde resin.

In an embodiment, the thickness (D) of the pressed building panel is between 1 mm and 20 mm, preferably between 2 mm and 12 mm.

In an embodiment, the building panel is selected from a floor panel, a wall panel or a furniture panel.

All aspects and embodiments discussed above are equally applicable to the method for producing a building panel.

In an embodiment there is a method for producing a building panel, comprising: providing a balancing layer (4) having at least one longitudinal edge and at least one latitudinal edge, wherein the longitudinal edge has a longitudinal length (X4) and a latitudinal edge has a latitudinal length (Y4), a top surface (4a) and a bottom surface (4b), wherein the bottom surface (4a) of the balancing layer (4) is configured to be mounted on a target surface suitable for covering with the building panel (11), applying a first sub-layer (3a) on a top surface (4a) of the balancing layer (4), providing a substrate (2) having a longitudinal edge and a latitudinal edge, the longitudinal edge has a length (X2) and a latitudinal length (Y2), a top surface (2a) and a bottom surface (2b), the top surface (2b) of the substrate (2) is configured to be connected to a surface layer (1), wherein the longitudinal length (X4) of the balancing layer (4) is essentially equal or less than the longitudinal length (X2) of the substrate (2); and the latitudinal length (Y4) of the balancing layer (4) is essentially equal or less than the latitudinal length (Y2) of the substrate (2); applying the substrate on the first sub-layer (3a) such that the longitudinal and the latitudinal edges of the balancing layer (4) do not extend beyond the corresponding longitudinal and latitudinal edges of the substrate (2); connecting a surface layer (1) to the top surface (2a) of the substrate (2a) by adhesive means (3b), applying heat and pressure to form a building panel (11).

In an embodiment, wherein the adhesive means are in a form of a liquid or a putty, the adhesive means are distributed by brushing onto the surface. In a preferred embodiment, the adhesive means are in a powder form. When adhesive is in a powder form, the adhesive is applied by scattering.

The pressure applied may be by a continuous press or a discontinuous press.

In an embodiment, the panel provided is essentially rectangular.

In an embodiment, the balancing layer (4) is positioned such that at least the latitudinal edge of the balancing layer (4) is off-set relative the corresponding latitudinal edge of the substrate (2) in a direction of an opposite latitudinal edge of the balancing layer (4) by 1 mm or more, such as by 2 mm or more in a building panel after applying heat and pressure.

In another embodiment of the method the balancing layer (4) is positioned such that at least the longitudinal edge of the balancing layer (4) is off-set relative the corresponding longitudinal edge of the substrate (2) in a direction of an opposite longitudinal edge of the balancing layer (4) by 1 mm or more, such as by 2 mm or more in the building panel after applying heat and pressure.

In another embodiment of the method the provided substrate is a wood fibre based core such as HDF board, MDF board, wood plastic composite, and plywood. In some embodiments, the substrate may be a stone plastic composite or plastic board.

In an embodiment of the method the substrate has a thickness D2 in a pressed building panel of between 1 and 15 mm.

In a method, the surface layer (1) is selected from a second wood veneer, a paper overlay, a powder based surface layer or a lacquer.

In an embodiment, the first and/or the second wood veneer is selected from oak, maple, birch, walnut, ash, fir and pine.

However, other types of wood are also possible.

In an embodiment, the adhesive (3b) is selected from a second binder, a second sub-layer (3b) comprising a second binder or a glue.

In an embodiment, the first and/or second binder are in powder form.

In an embodiment, the provided first and/or second binder is a thermoplastic or thermosetting binder.

In an embodiment, the balancing layer (4) has a thickness D4 in a pressed panel of between 0.2 mm and 2.5 mm.

In an embodiment, the first sub-layer (3a) and/or the second sub-layer (3b) comprise inorganic fillers.

The fillers provided in a method are the same as disclosed above in relation to the building panel.

The method to produce a building panel, wherein the first sub-layer (3a) and/or the second sub-layer (3b) comprise fibres, preferably wood fibres.

In an embodiment of the method the first binder is the same or different from the second binder.

In an embodiment, the first binder and/or second binder is a melamine formaldehyde resin.

In an embodiment, the thickness (D) of the pressed building panel is between 1 mm and 20 mm, preferably between 4 mm and 12 mm.

In an embodiment, the building panel is selected from a floor panel, a wall panel or a furniture panel.

At least some of these and other objects and advantages that will be apparent from the description.

Embodiments

In an embodiment there is disclosed a building panel, comprising: a balancing layer, said balancing layer having at least one longitudinal edge and at least one latitudinal edge, wherein the longitudinal edge has a longitudinal length (X4) and a latitudinal edge has a latitudinal length (Y4), a top surface and a bottom surface, a first sub-layer comprising a first binder and arranged on the top surface of the balancing layer; a substrate arranged on top of the first sub-layer, said substrate having a longitudinal edge and a latitudinal edge, the longitudinal edge has a longitudinal length (X2) and a latitudinal edge has a latitudinal length (Y2), a top surface and a bottom surface, wherein the bottom surface of the balancing layer is configured to be mounted on a target surface suitable for covering with the building panel and the top surface of the substrate is configured to be connected to a surface layer, wherein the longitudinal length (X4) of the balancing layer is essentially equal or less than the longitudinal length (X2) of the substrate; and the latitudinal length (Y4) of the balancing layer is essentially equal or less than the latitudinal length (Y2) of the substrate; said building panel further comprising a surface layer connected to the top surface by adhesive means; wherein the balancing layer is positioned in the assembled building panel such that the longitudinal and the latitudinal edges of the balancing layer do not extend beyond the corresponding longitudinal and latitudinal edges of the substrate.

In another embodiment, there is disclosed the building panel, wherein the building panel is essentially rectangular and a balancing layer optionally comprises a first wood veneer.

In another embodiment, there is disclosed the building panel, wherein the balancing layer is positioned in the assembled building panel such that at least the latitudinal edge of the balancing layer is off-set relative the corresponding latitudinal edge of the substrate in a direction of an opposite latitudinal edge of the balancing layer by 1 mm or more, such as by 2 mm or more.

In another embodiment, there is disclosed the building panel, wherein the balancing layer is positioned in the assembled building panel such that at least the longitudinal edge of the balancing layer is off-set relative the corresponding longitudinal edge of the substrate in a direction of an opposite longitudinal edge of the balancing layer by 1 mm or more, such as by 2 mm or more.

In another embodiment, there is disclosed the building panel, wherein the substrate is a wood fibre based core such as HDF board, MDF board, wood plastic composite or plywood.

In another embodiment, there is disclosed the building panel, wherein the substrate has a thickness D2 in a pressed building panel of between 1 and 15 mm.

In another embodiment, there is disclosed the building panel, wherein the surface layer is selected from a second wood veneer, a paper overlay, a powder based surface layer or a lacquer.

In another embodiment, there is disclosed the building panel, wherein the first and/or the second wood veneer is selected from oak, maple, birch, walnut, ash, fir and pine.

In another embodiment, there is disclosed the building panel, wherein the adhesive is selected from a second binder, a second sub-layer comprising a second binder or a glue.

In another embodiment, there is disclosed the building panel, wherein the first and/or second binder are in powder form.

In another embodiment, there is disclosed the building panel, wherein the first and/or second binder is a thermoplastic or thermosetting binder.

In another embodiment, there is disclosed the building panel, wherein the balancing layer has a thickness D4 in a pressed panel of between 0.2 mm and 2.5 mm.

In another embodiment, there is disclosed the building panel, wherein the first sub-layer and/or the second sub-layer comprise inorganic fillers.

In another embodiment, there is disclosed the building panel, wherein the first sub-layer and/or the second sub-layer comprise fibres, preferably wood fibres.

In another embodiment, there is disclosed the building panel, wherein the first binder is the same or different from the second binder.

In another embodiment, there is disclosed the building panel, wherein the first binder and/or second binder is a melamine formaldehyde resin.

In another embodiment, there is disclosed the building panel, wherein the thickness (D) of the pressed building panel is between 1 mm and 20 mm, preferably between 2 mm and 12 mm.

In another embodiment, there is disclosed the building panel, wherein the building panel is selected from a floor panel, a wall panel or a furniture panel.

In another embodiment there is disclosed a method for producing a building panel, comprising: providing a balancing layer having at least one longitudinal edge and at least one latitudinal edge, wherein the longitudinal edge has a longitudinal length (X4) and a latitudinal edge has a latitudinal length (Y4), a top surface and a bottom surface, wherein the bottom surface of the balancing layer is configured to be mounted on a target surface suitable for covering with the building panel, applying a first sub-layer on a top surface of the balancing layer, providing a substrate having a longitudinal edge and a latitudinal edge, the longitudinal edge has a length (X2) and a latitudinal edge has a length (Y2), a top surface and a bottom surface, the top surface of the substrate is configured to be connected to a surface layer, wherein the longitudinal length (X4) of the balancing layer is essentially equal or less than the longitudinal length (X2) of the substrate; and the latitudinal length (Y4) of the balancing layer is essentially equal or less than the latitudinal length (Y2) of the substrate; applying the substrate on the first sub-layer such that the longitudinal and the latitudinal edges of the balancing layer do not extend beyond the corresponding longitudinal and latitudinal edges of the substrate; connecting a surface layer to the top surface of the substrate by adhesive means, applying heat and pressure to form a building panel.

In another embodiment, there is disclosed the method for producing a building panel, wherein the building panel is essentially rectangular and optionally comprises a first wood veneer.

In another embodiment, there is disclosed the method for producing a building panel, wherein the balancing layer is positioned in the assembled building panel such that at least the latitudinal edge of the balancing layer is off-set relative the corresponding latitudinal edge of the substrate in a direction of an opposite latitudinal edge of the balancing layer by 1 mm or more, such as by 2 mm or more.

In another embodiment, there is disclosed the method for producing a building panel, wherein the balancing layer is positioned in the assembled building panel such that at least the longitudinal edge of the balancing layer is off-set relative the corresponding longitudinal edge of the substrate in a direction of an opposite longitudinal edge of the balancing layer by 1 mm or more, such as by 2 mm or more.

In another embodiment, there is disclosed the method for producing a building panel, wherein the substrate is a wood fibre based core such as HDF board, MDF board, wood plastic composite, and plywood.

In another embodiment, there is disclosed the method for producing a building panel, wherein the substrate has a thickness D2 in a pressed building panel of between 1 and 15 mm.

In another embodiment, there is disclosed the method for producing a building panel, wherein the surface layer is selected from a second wood veneer, a paper overlay, a powder based surface layer or a lacquer.

In another embodiment, there is disclosed the method for producing a building panel, wherein the first and/or the second wood veneer is selected from oak, maple, birch, walnut, ash, fir and pine.

In another embodiment, there is disclosed the method for producing a building panel, wherein the adhesive (3b) is selected from a second binder, a second sub-layer (3b) comprising a second binder or a glue.

In another embodiment, there is disclosed the method, wherein the first and/or second binder are in powder form.

In another embodiment, there is disclosed the method, wherein the first and/or second binder is a thermoplastic or thermosetting binder.

In another embodiment, there is disclosed the method, wherein the balancing layer has a thickness D4 in a pressed panel of between 0.2 mm and 2.5 mm.

In another embodiment, there is disclosed the method, wherein the first sub-layer and/or the second sub-layer comprise inorganic fillers.

In another embodiment, there is disclosed the method, wherein the first sub-layer and/or the second sub-layer comprise fibres, preferably wood fibres.

In another embodiment, there is disclosed the method, wherein the first binder is the same or different from the second binder.

In another embodiment, there is disclosed the method, wherein the first binder and/or second binder is a melamine formaldehyde resin.

In another embodiment, there is disclosed the method, wherein the thickness (D) of the pressed building panel is between 1 mm and 20 mm, preferably between 4 mm and 12 mm.

In another embodiment, there is disclosed the method, wherein the building panel is selected from a floor panel, a wall panel or a furniture panel.

Example: Adhesion Effect Due to Balancing Layer Positioning Relative the Substrate Around 100 pressings were made using an industrial sized short cycle press. The elements were positioned on the board so that the balancing veneer layer had a protrusion on one short side, called protrusion side, and an indentation nor edge-to-edge positioning on the other short side, called indentation side, as illustrated in FIG. 5. After pressing, the specimens were ocular inspected and sawn into individual planks. All edges were profiled, essentially meaning all edges were cut, in order to see whether the profiling step was affected by how the veneer was positioned relative the board during pressing.

It was observed that the protrusion sides had amounts of binder pearling on the protruding veneer outside of the board edge. These binder pearls were not present on the indentation side. The binder pearls were obviously not used to penetrate and glue the veneer to the board, hence resulting in lower adhesion strength. The lower adhesion strength on the protrusion side was confirmed during profiling since the veneers tended to chip and partly flake off to expose the board when cutting the protrusion side (FIG. 6A). Corresponding indentation side showed no chipping (FIG. 6B). It is therefore clear that the balancing layer edges should be positioned edge-to-edge with or with an indentation relative the substrate.

The invention claimed is:

1. A building panel, comprising:
   a balancing layer having a top surface and a bottom surface, the balancing layer comprising a first wood veneer having a grain direction,
   a first sub-layer is arranged on the top surface of the balancing layer, the first sub-layer comprising a first binder,
   a core arranged on the first sub-layer,
   a surface layer arranged on the core, the surface layer having a top surface and a bottom surface, wherein the top surface of the surface layer is adapted to be a visible surface of the building panel when installed,
   wherein an extension of the balancing layer in a direction parallel to the grain direction of the first wood veneer is less than an extension of the first sub-layer in the direction parallel to the grain direction of the first wood veneer, and
   wherein the balancing layer is arranged within the extension of the first sub-layer in the direction parallel to the grain direction of the first wood veneer.

2. The building panel according to claim 1, wherein an extension of the balancing layer in a direction transverse to the grain direction of the first wood veneer is equal or less than an extension of the first sub-layer in the direction transverse to the grain direction of the first wood veneer, and
   wherein the balancing layer is arranged within the extension of the first sub-layer in the direction transverse to the grain direction of the first wood veneer.

3. The building panel according to claim 1, wherein the core, in the direction parallel to the grain direction of the first wood veneer, extends beyond an edge of the balancing layer with a distance of 1 mm or more.

4. The building panel according to claim 1, wherein the core, in the direction transverse to the grain direction of the first wood veneer, extends beyond an edge of the balancing layer with a distance of 1 mm or more.

5. The building panel according to claim 1, wherein the core is a wood-based core.

6. The building panel according to claim 1, wherein the surface layer comprising a second wood veneer.

7. The building panel according to claim 6, wherein an extension of the surface layer in a direction parallel to a grain direction of the second wood veneer is equal or less than an extension of the balancing layer in the direction parallel to the grain direction of the second wood veneer.

8. The building panel according to claim 6, wherein an extension of the surface layer in a direction transverse to a grain direction of the second wood veneer is equal or less than an extension of the balancing layer in the direction parallel to the grain direction transverse of the second wood veneer.

9. The building panel according to claim 1, wherein the first binder is a thermoplastic or a thermosetting binder.

10. The building panel according to claim 1, wherein the first binder is an amino resin.

11. A building panel, comprising:
a balancing layer having a top surface and a bottom surface, the balancing layer comprising a first wood veneer having a grain direction,
a first sub-layer is arranged on the top surface of the balancing layer, the first sub-layer comprising a first binder,
a core arranged on the first sub-layer, wherein the core has a top surface and a bottom surface, wherein the bottom surface of the core is arranged on the first sub-layer,
a surface layer arranged on the core, the surface layer having a top surface and a bottom surface, wherein the top surface of the surface layer is adapted to be a visible surface of the building panel when installed,
wherein an extension of the balancing layer in a direction parallel to the grain direction of the first wood veneer is less than an extension of the bottom surface of the core in the direction parallel to the grain direction of the first wood veneer, and
wherein the balancing layer is arranged within the extension of the bottom surface of the core in the direction parallel to the grain direction of the first wood veneer,
wherein the balancing layer extends along the direction parallel to the grain direction of the first wood veneer from a first edge to a second edge, and wherein the first and second edges of the balancing layer are free of overlap with any edge of the core.

12. The building panel according to claim 11, wherein an extension of the balancing layer in a direction transverse to the grain direction of the first wood veneer is equal or less than an extension of the core in the direction transverse to the grain direction of the first wood veneer, and
wherein the balancing layer is arranged within the extension of the bottom surface of the core in the direction transverse to the grain direction of the first wood veneer.

13. The building panel according to claim 11, wherein the bottom surface of the core, in the direction parallel to the grain direction of the first wood veneer, extends beyond an edge of the balancing layer with a distance of 1 mm or more.

14. The building panel according to claim 11, wherein the bottom surface of the core, in the direction transverse to the grain direction of the first wood veneer, extends beyond an edge of the balancing layer with a distance of 1 mm or more.

15. The building panel according to claim 11, wherein the core is a wood-based core.

16. The building panel according to claim 11, wherein the surface layer comprising a second wood veneer.

17. The building panel according to claim 16, wherein an extension of the surface layer in a direction parallel to a grain direction of the second wood veneer is equal or less than an extension of the balancing layer in the direction parallel to the grain direction of the second wood veneer.

18. The building panel according to claim 16, wherein an extension of the surface layer in a direction transverse to a grain direction of the second wood veneer is equal or less than an extension of the balancing layer in the direction parallel to the grain direction transverse of the second wood veneer.

19. The building panel according to claim 11, wherein the first binder is a thermoplastic or a thermosetting binder.

20. The building panel according to claim 11, wherein the first binder is an amino resin.

* * * * *